United States Patent
Shetty

(10) Patent No.: US 10,242,025 B2
(45) Date of Patent: Mar. 26, 2019

(54) EFFICIENT DIFFERENTIAL TECHNIQUES FOR METAFILES

(71) Applicant: NETAPP, INC., Sunnyvale, CA (US)

(72) Inventor: Rithin Shetty, Sunnyvale, CA (US)

(73) Assignee: NeTAPP, INC., Sunnyvale, CA (US)

( * ) Notice: Subject to any disclaimer, the term of this patent is extended or adjusted under 35 U.S.C. 154(b) by 654 days.

(21) Appl. No.: 14/924,484

(22) Filed: Oct. 27, 2015

(65) Prior Publication Data

US 2017/0116219 A1    Apr. 27, 2017

(51) Int. Cl.
*G06F 17/30* (2006.01)

(52) U.S. Cl.
CPC .. *G06F 17/30174* (2013.01); *G06F 17/30076* (2013.01); *G06F 17/30088* (2013.01); *G06F 17/30106* (2013.01); *G06F 17/30203* (2013.01); *G06F 17/30215* (2013.01); *G06F 17/30327* (2013.01)

(58) Field of Classification Search
CPC ......... G06F 17/30174; G06F 17/30076; G06F 17/30088; G06F 17/30106; G06F 17/30327; G06F 17/30203; G06F 17/30215
See application file for complete search history.

(56) References Cited

U.S. PATENT DOCUMENTS

| | | | |
|---|---|---|---|
| 7,437,523 B1 * | 10/2008 | Ting | G06F 17/30067 711/161 |
| 7,743,038 B1 * | 6/2010 | Goldick | G06F 17/302 707/694 |
| 7,818,299 B1 * | 10/2010 | Federwisch | G06F 11/2066 707/620 |
| 8,321,380 B1 * | 11/2012 | Leverett | G06F 17/30212 707/660 |
| 8,655,848 B1 | 2/2014 | Leverett et al. | |
| 2003/0182312 A1 | 9/2003 | Chen et al. | |
| 2005/0286522 A1 * | 12/2005 | Paddon | H04L 63/0227 370/389 |

OTHER PUBLICATIONS

Int. Search Report/WrittenOpinion cited in PCT Application No. PCT/US2016/059077 dated Dec. 13, 2016, 10 pgs.

* cited by examiner

*Primary Examiner* — Albert M Phillips, III
(74) *Attorney, Agent, or Firm* — Cooper Legal Group, LLC

(57) ABSTRACT

Exemplary embodiments provide methods, mediums, and systems for replicating metafiles between a source and a destination. The metafile may be subdivided into blocks. The contents of the metafile may be transferred by locating the blocks which are changed between the source version of the metafile and the destination version of the metafile. The changed blocks may be examined to retrieve the contents of the changed blocks. The records in the changed blocks may be evaluated to determine whether to create a corresponding record at the destination, delete a corresponding record at the destination, or update a corresponding record at the destination. Accordingly, the metafile may be replicated in a logical manner, by transferring only changed records rather than the entirety of a changed block. Moreover, the transfer is conducted efficiently because unchanged blocks are eliminated from consideration at the outset.

20 Claims, 8 Drawing Sheets

EFFICIENT DIFFERENTIAL TECHNIQUES FOR METAFILES

BACKGROUND

File systems use metafiles to track metadata in a volume. For example, the metadata may describe where files are stored in the volume. Some replication systems may replicate files, including metafiles, between a source file system and a destination file system. When replicating metafiles, it is important to carry out the replication in an efficient manner that nonetheless preserves the contents of the metafile in a format that may be understood by the destination file system.

DETAILED DESCRIPTION

Exemplary embodiments provide methods, mediums, and systems for replicating metafiles between a source and a destination. The metafile may be subdivided into blocks. The contents of the metafile may be transferred by locating the blocks which are changed between the source version of the metafile and the destination version of the metafile. The changed blocks may be examined to retrieve the contents of the changed blocks. The records in the changed blocks may be evaluated to determine whether to create a corresponding record at the destination, delete a corresponding record at the destination, or update a corresponding record at the destination. Accordingly, the metafile may be replicated in a logical manner, by transferring only changed records rather than the entirety of a changed block. Moreover, the transfer is conducted efficiently because unchanged blocks are eliminated from consideration at the outset.

Metafiles may be subdivided into blocks for ease of storage or transference. In some circumstances, a replication system could realize increased efficiencies by sending only those blocks in the source metafile that were changed since the previous update transfer. This may involve locating the changed blocks and sending them as-is to their destination.

However, such an operation may be problematic if the metafiles are versioned. For example, the source and destination may be running different file system versions, and so the format of the metafile on the source may differ from the format of the metafile on the destination. File formats could include, but are not limited to, flat files of different formats, a B+ tree, etc. As a result, the destination may not be able to make sense of the source's file if the sources' file blocks are sent verbatim.

According to exemplary embodiments, the source and destination may maintain different snapshots of a metafile, where a snapshot represents the contents of the metafile at a given point in time. When a destination requests that a snapshot stored on a source be replicated, an incremental logical replication system sends only the changes since the last update rather than the entire content of the block or file. The system identifies changed records by first filtering out unchanged blocks within the snapshot of the metafile, and then examining the changed blocks to locate records that are different between the source version of the snapshot and the destination version of the snapshot.

Figures 1A, 1B:
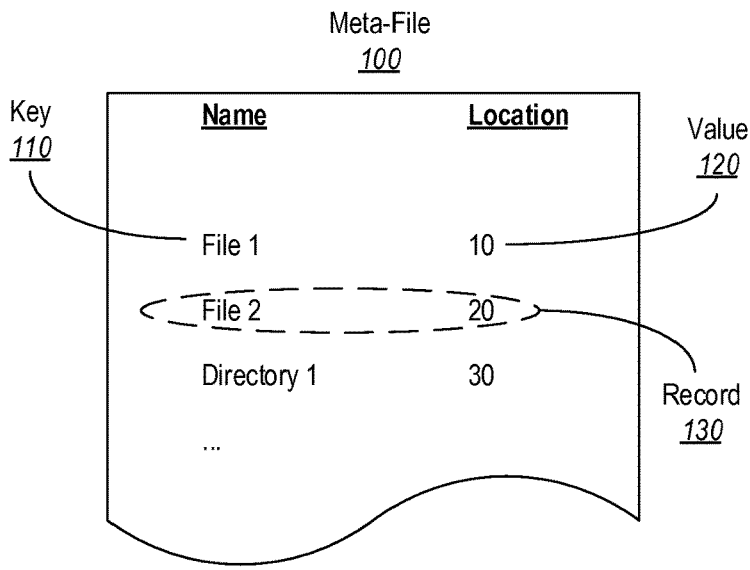
FIGS. 1A-1B depict examples of metafile.

FIGS. 1A, 1B depict two different examples of a metafile. The metafile 100 may include one or more keys 110 that match to values 120. A key/value pair is referred to herein as a record 130. They keys 110 may be used to look up a known value to determine a corresponding dependent value 120. Collectively, the records 130 stored in a metafile or block within a metafile are referred to as the content of the file or block.

In the example of FIG. 1A, the keys 110 correspond to the name of a file or directory stored in a storage volume. The values 120 correspond to an absolute location of the named file or directory in the storage volume.

In the example of FIG. 1B, the keys represent a hash value calculated over a name or identifier of a data object. The values correspond to an offset or relative location of the data object.

Although two examples of metafiles are provided in FIGS. 1A and 1B, one of ordinary skill in the art will recognize that metafiles are not limited to the specific structures depicted.

Figure 2A:
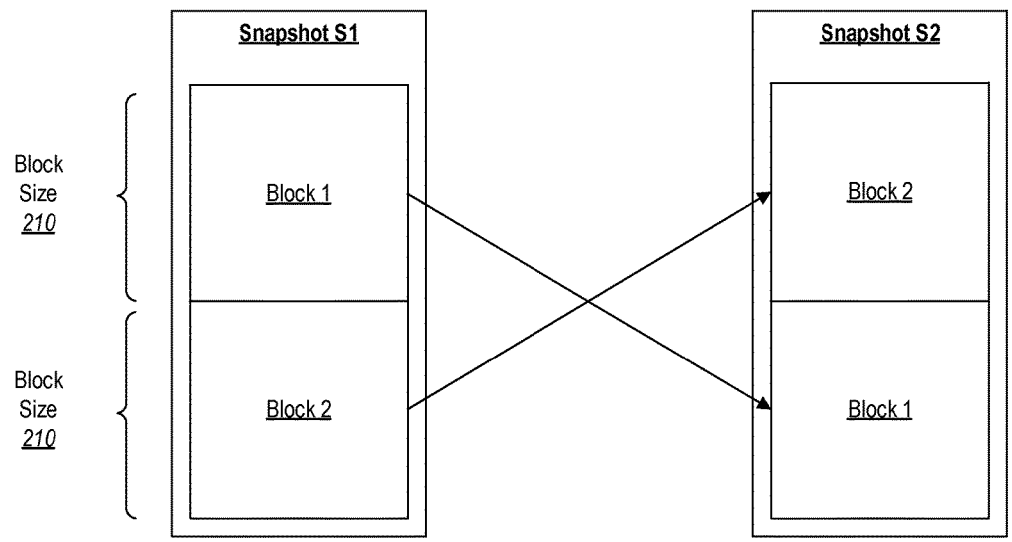
FIG. 2A depicts two versions of a me having different structures.

Metafiles, or snapshots of metafiles, may be subdivided into blocks as shown in FIG. 2A. The blocks may have a block size 210, which may be dependent on a client's input/output sizes. For example, if a client supports a read or write operation having a size of 4 kilobytes, then the metafile blocks on the client may be 4 kilobytes in size. In one embodiment, block sizes of 16 kilobytes may be used.

A brief overview of snapshotting is now provided for context. A file or volume snapshotting process may occur in real-time as data (e.g., files or other data objects) are created or edited on a volume. A volume may be a defined area on a disk that is logically separated from other volumes on the disk, such as a partition or a designated storage area. In some embodiments, the data referred to herein may be stored in a Data ONTAP volume from NetApp, Inc., of Sunnyvale Calif. Data ONTAP volumes include built-in functionality for performing snapshotting, and hence may be particularly well-suited for use in exemplary embodiments. Nonetheless, one of ordinary skill in the art will recognize that snapshotting may be employed in conjunction with any type of volume.

When a file is created or updated, a "write" command may be issued by the operating system to effect the change. An operating system (OS) write command is a command to write certain data to a disk block in the volume. The "write" command may be intercepted from the operating system. If snapshotting were not employed, an OS write command would cause the old data in the disk block to be changed or overwritten. However, when snapshotting is employed, the intercepted write command is redirected to a new disk block, which stores the changed data that the OS had originally designated for the original disk block.

Accordingly, the original disk block continues to store the original version of the data, while the new disk block stores the updated copy of the data. The original disk block therefore represents a read-only "snapshot" of the data at the time before the write command was issued, while the new disk block represents the current (up-to-date) version of the data.

The generation of snapshots may be performed automatically (e.g., at predetermined times and/or under predetermined conditions), and/or may be performed manually (e.g., in response to a specific request to snapshot a file or a volume).

As more write commands are intercepted and redirected, different subsets of the disk blocks in the volume represent snapshots of the file at different times. Accordingly, the system may maintain meta-data relating to the volume. The meta-data may identify which disk blocks contain data relating to particular snapshots on the volume. When a file's snapshot is requested for a particular time, the appropriate disk blocks corresponding to the volume snapshot at the time the request was received may be identified. To this end, the meta-data associated with the snapshot may be consulted to determine which disk blocks represent the correct file snapshot.

In response to a request for a particular snapshot, the system may consult the above-described meta-data, and may return (in response to the request) an identification of the location of the disk blocks representing the snapshot. Regardless of the size of the data in the snapshot, this procedure can be carried out in constant time because no data needs to be copied. Instead (for example), only a simple lookup of the requested time is carried out in the meta-data, and a corresponding list of disk blocks is returned.

FIG. 2A illustrates an embodiment of snapshots. As shown in FIG. 2A, as different snapshots are created, the relative location of individual blocks within the snapshot may be changed. For example, FIG. 2A shows an example of a first snapshot S1 where the records of the first block (Block 1) appear before the records of the second block (Block 2), and an example of a second snapshot S2 where the records originally found in the first block (Block 1) now appear after the records originally found in the second (Block 2). Accordingly, determining whether individual records have been changed between two snapshots may be difficult: a record that appears near the beginning of the first snapshot S1 could appear near the end of the second snapshot S2, or might have been deleted and hence does not appear in snapshot S2.

Nonetheless, once the differences between snapshots are determined, replicating a snapshot between a source and a destination may be a relatively efficient process.

Figure 2B:
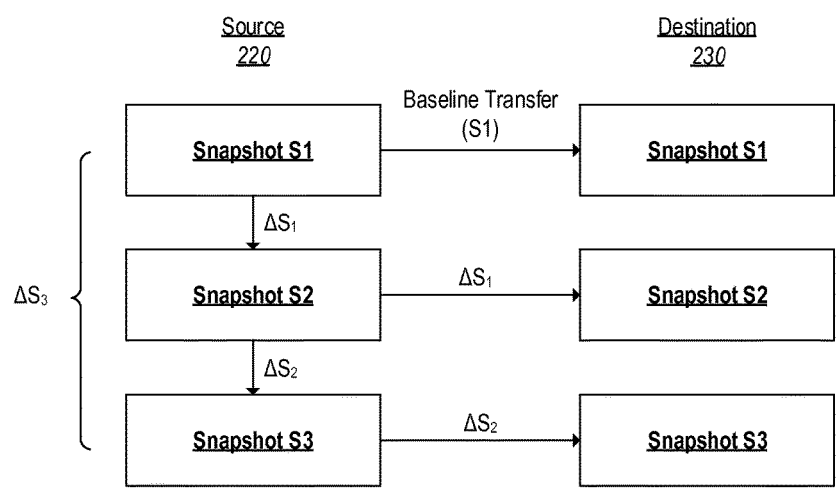
FIG. 2B depicts a technique for replicating snapshots of metafiles

FIG. 2B depicts a series of snapshots stored on a source 220, which are replicated on a destination 230. It is noted that the source 220 and destination 230 may be running different versions of a file system, such that the blocks or metafiles of the source 220 may not be comprehensible to the destination 230 if sent as-a-whole.

On the source 220, a first snapshot S1 of a metafile is created. As the metafile is changed, a second snapshot S2 is created. The changes to records between the first snapshot S1 and the second snapshot S2 are represented by $\Delta S_1$. The second snapshot S2 refers back to the first snapshot S1 and the changes $\Delta S_1$: because only the changes $\Delta S_1$ need to be stored as new data, the second snapshot S2 can be stored efficiently. Similarly, changes to records between the second snapshot S2 and a third snapshot S3 are represented by $\Delta S_2$.

Thus, the third snapshot S3 need only store a reference back to the second snapshot S2, and the changes $\Delta S_2$.

The destination 230 may request that the metafile represented by the snapshots S1, S2, S3 be replicated at the destination 230. Typically the destination 230 will request the current version of the metafile, but it is possible that the destination 230 will request a version of the metafile that existed at some time in the past. For ease of discussion, it will be assumed that the destination 230 requests the contemporary version of the metafile.

Initially, while the source 220 stores only the first snapshot S1, the destination 230 may not have any copy of the metafile. Accordingly, the source 220 may perform a baseline transfer and send the entire first snapshot S1 to the destination 230.

After receiving the first snapshot S1, the destination 230 may subsequently request an updated version of the metafile corresponding to the second snapshot S2. At this stage, the source 220 need only send the changes $\Delta S_1$, which may then be applied by the destination 230 in order to replicate the second snapshot S2.

Similarly, in order to subsequently replicate the third snapshot S3, the source may send only the changes $\Delta S_2$, which may then be applied by the destination 230.

In another example, the destination 230 may receive the first snapshot S1 and then may request an updated version of the metafile at a time in which the source 220 has transitioned to the third snapshot S3. Accordingly, the source 220 may send a set of changes $\Delta S_3$ that corresponds to the difference between the first snapshot S1 and the third snapshot S3.

FIGS. 3-7 describe exemplary techniques for identifying the changed records represented by each $\Delta S$, and transmitting those changes to a destination.

Figure 3:
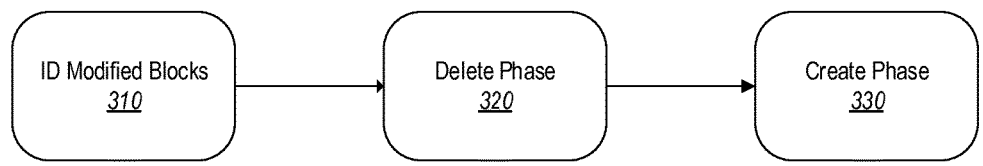
FIG. 3 depicts an overview of a method for finding changed information between two versions of a metafile.

FIG. 3 depicts a high-level overview of the processes for replicating a metafile stored at a source on a destination. In one or more embodiments, the current version of a metafile snapshot stored on the destination is referred to as the "base" version. The requested version that is stored on the source is referred to as the "incremental" version.

At operation 310, the replication system may identify any blocks that have been modified between the incremental version stored on the source and the base version stored on the destination. This may be accomplished by using a buff tree, as described in more detail in connection with FIGS. 5A-5B.

At operation 320, records that are found in the base version, but not the incremental version, may be deleted. These records were deleted in the $\Delta S$ between the base version and the incremental version. This delete phase is described in more detail in connection with FIG. 6.

At operation 330, records that are not found in the base version, but are found in the incremental version, may be created. Simultaneously, records that exist in both versions may be checked to ensure that the key/value pairs match. If the value associated with a particular key has been changed from the base version to the incremental version, then the record on the destination may be updated with the correct value. This create phase is described in more detail in connection with FIG. 7.

Figure 4:
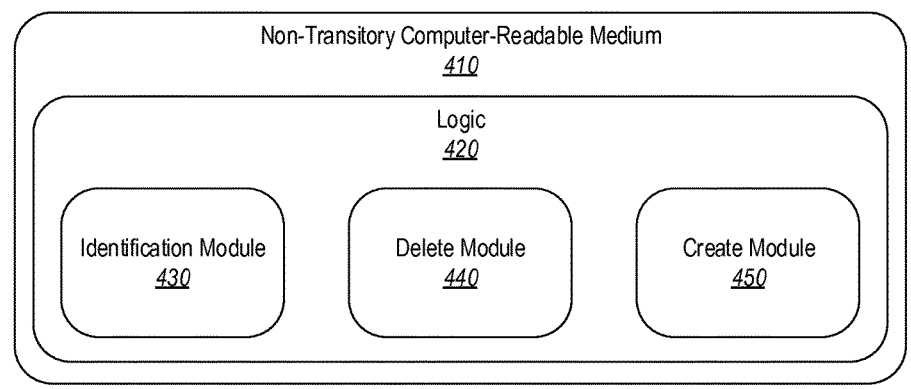
FIG. 4 depicts exemplary structures suitable for carrying out the method depicted in FIG. 3.

FIG. 4 illustrates an embodiment of a computer-readable medium. As shown in FIG. 4, operations 310-330 may be embodied as instructions stored on a non-transitory computer-readable medium 410. The instructions may be in the form of computer-implemented logic 420 storing a series of modules for carrying out each operation or series of operations shown in FIG. 3. For example, an identification module may carry out the identification operation 310, a delete module 440 may carry out the delete phase 320, and a create module 450 may carry out the create phase 330.

Figure 5A:
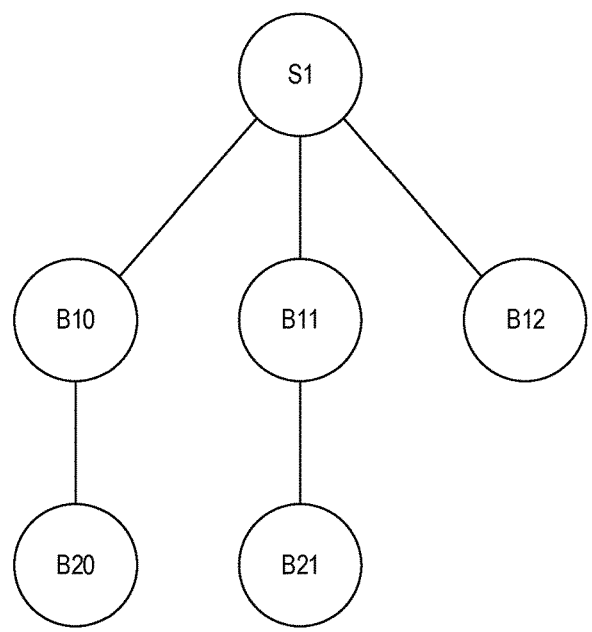
FIGS. 5A-5B depicts examples of buff trees for finding differences between two metafiles.
Figure 5B:
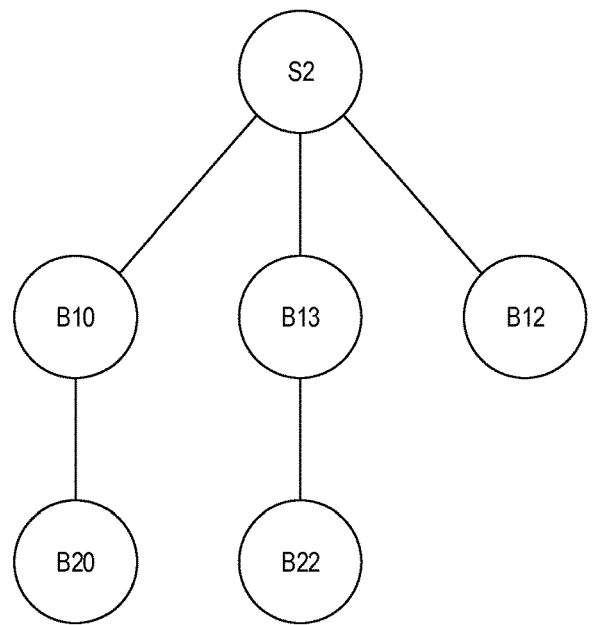

FIGS. 5A, 5B depict an example of a buff tree suitable for use in the identification of modified blocks in a snapshot. Each block in the snapshot is associated with a node in the tree, and each node may be associated with an identifier. As the blocks are modified from one snapshot to another, a new identifier may be associated with the node corresponding to the block. For example, the blocks associated with nodes B11 and B21 in snapshot S1 have been modified in snapshot S2. Accordingly, these nodes have been assigned new identifiers (B13 and B22, respectively).

Moreover, the nodes in a branch of the tree may be arranged or rearranged such that a parent node is only associated with a changed identifier if all of its children are associated with changed identifiers. In other words, if the tree is traversed down from the root, then upon reaching a node with a changed identifier it can be assumed that all child nodes depending from the node with the changed identifier will also have changed identifiers. In some embodiments, only some of the child nodes may be different in this circumstance. For example, in some embodiments, if a parent node holds pointers to multiple leaf nodes, only one of the leaf nodes might be changed.

This makes it relatively simple to locate the blocks in a snapshot that include changed records. Each branch of the buff tree may be traversed until a leaf node is reached (indicating that there are no changed blocks on the branch) or until a changed node is reached (indicating that the changed node, and all child nodes depending from the changed node, include changed records).

As the tree is traversed, a list of the nodes including changed records may be maintained. The list represents a filtered list of the blocks in the snapshot, in which blocks that have not been changed have been filtered out. Because only the changed blocks will be analyzed in subsequent operations, this filtering process increases the efficiency of the overall algorithms.

It will be apparent that the process can also work in reverse, such that blocks in the second snapshot S2 that are different as compared to the first snapshot S1 can be readily identified.

Further examples of finding differences using buff trees may be found in U.S. Pat. No. 6,993,539, entitled "System and method for determining changes in two snapshots and for transmitting changes to destination snapshot" and filed on Mar. 19, 2002.

Figure 6:
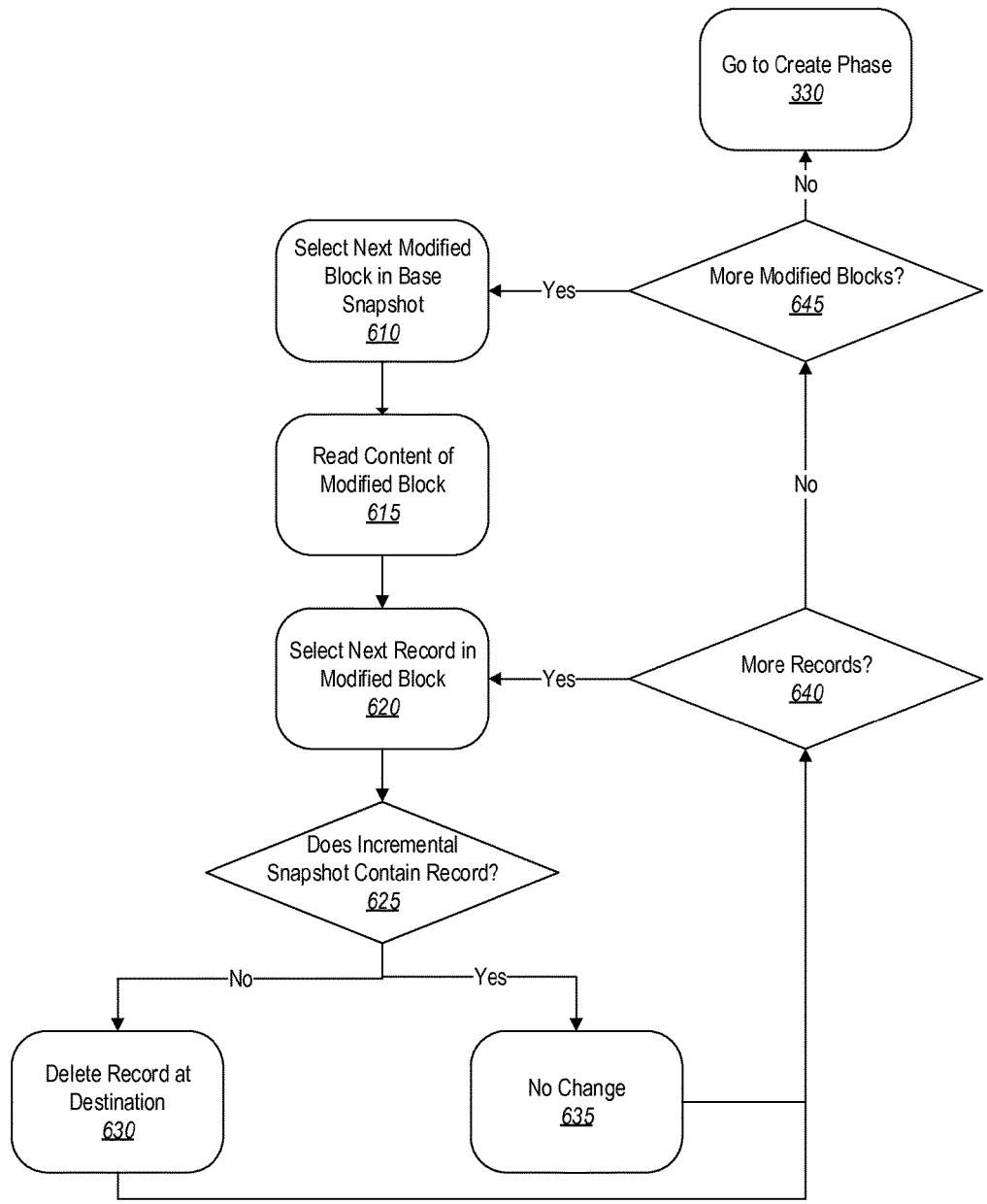
FIG. 6 depicts the "delete" operations of FIG. 3 in more detail.

FIG. 6 depicts an example of a delete phase. After identifying the blocks having changed records, the replication system carries out the delete phase 320 on the changed blocks, as shown in FIG. 6.

At operation 610, the replication system selects the next modified block in the base snapshot. At operation 615, the replication system reads the contents of the selected modified block to retrieve the individual records stored in the modified block. Because the block has been flagged as modified, at least one of these records will necessarily be modified. However, it is not necessarily the case that all records will be modified.

To determine whether each record has been modified, the replication system selects the next record in the modified block at operation 620. At operation 625, the incremental snapshot is compared to the record from the base snapshot that was selected at operation 620 in order to determine whether the incremental snapshot contains a record corresponding to the selected record (e.g., a record having the same key).

If the record was not found in the incremental snapshot (i.e., the source's snapshot does not contain the record, whereas the destination's snapshot does), then a delete command may be issued to the destination at operation 630. The delete command may cause the destination to delete the record corresponding to the selected record from the metafile snapshot.

If it is determined at operation 625 that the incremental snapshot does contain the selected record, then at operation 635 the replication system does not make any change to the base snapshot. There are two possibilities in this case. First, a corresponding record may have been found having the same key/value pair as in the selected record. In this case, there is no need to change the record because the base snapshot's and the incremental snapshot's records are the same. Second, a corresponding record may have been found, but the key/value pair may be different. This case will be handled in the create phase described in connection with FIG. 7.

At operation 640, it may be determined whether any additional records exist in the current modified block. If so, processing returns to operation 620, and the next record is selected. If not, processing proceeds to operation 645.

At operation 645, it may be determined whether any additional modified blocks exist in the metafile snapshot. If so, processing returns to operation 610 and the replication system selects the next modified block for analysis. If not, processing proceeds to operation 330 and the replication system begins the create phase.

Figure 7:
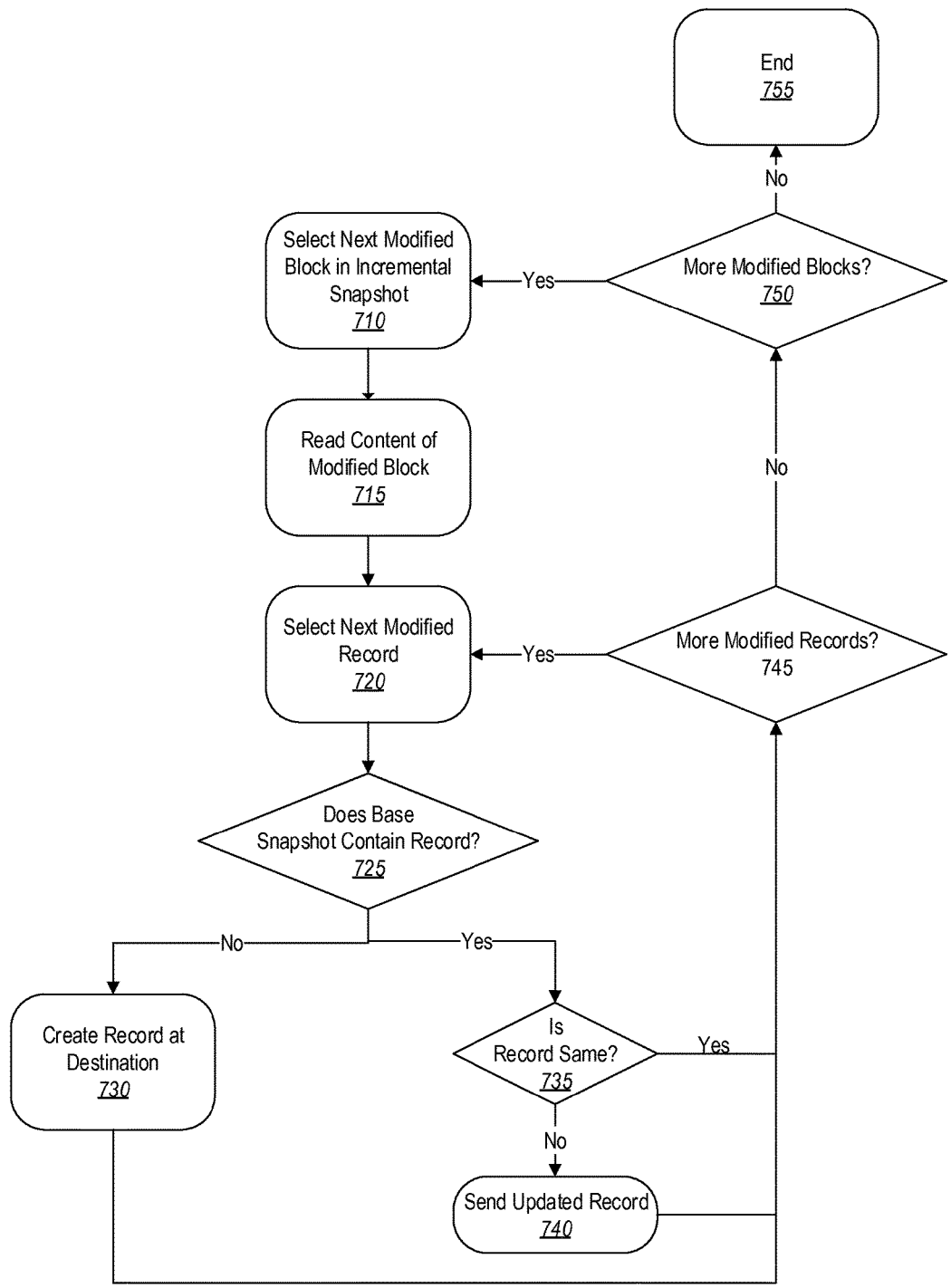
FIG. 7 depicts the "create" operations of FIG. 3 in more detail.

FIG. 7 depicts an example of a create phase. The create phase begins at operation 710, where the next modified block in the incremental snapshot is selected. At operation 715, the replication system reads the contents of the selected modified block to retrieve the individual records stored in the modified block.

The replication system selects the next record in the modified block at operation 720. At operation 725, the base snapshot is compared to the record from the incremental snapshot that was selected at operation 720 in order to determine whether the base snapshot contains a record corresponding to the selected record (e.g., a record having the same key).

If the record was not found in the base snapshot (i.e., the destination's snapshot does not contain the record, whereas the source's snapshot does), then a create command may be issued to the destination at operation 730. The create command may cause the destination to create a record corresponding to the selected record from the metafile snapshot.

If it is determined at operation 725 that the base snapshot does contain the selected record, then at operation 735 the replication system determines whether the record is the same between the base snapshot and the incremental snapshot (e.g. the corresponding records have matching key/value pairs). If not (i.e., the records differ), then at operation 740 the replication system may send an updated record to the destination so that the destination system can update its version of the snapshot with the updated record data. Processing then proceeds to operation 745.

If it is determined at operation 735 that the records are the same, then no action needs to be taken, since the record at the destination is the same as the record at the source. Accordingly, processing proceeds to operation 745.

At operation 745, it may be determined whether any additional records exist in the current modified block. If so, processing returns to operation 720, and the next record is selected. If not, processing proceeds to operation 750.

At operation 750, it may be determined whether any additional modified blocks exist in the metafile snapshot. If so, processing returns to operation 710 and the replication system selects the next modified block for analysis. If not, processing proceeds to operation 755 and processing ends.

Using the above-described techniques, metafiles may be efficiently differentiated in any format, or metafiles with records of variable sizes may be differentiated. Advantageously, these techniques do not require in-core or on-disk caching of the metafile. For instance, Applications for these techniques include, but are not limited to:

1) Differentiating a stream directory attached to a Logical Unit Number (LUN)/file as represented in the Write-Anywhere File Layout (WAFL) system of NetApp, Inc. The directory may be a flat metafile, where records (in the form of directory entries) may exist anywhere in the file. There does not need to be a fixed location for records.
2) Differentiating a Clone Auto Delete (CAD) metafile (as represented in the Write-Anywhere File Layout (WAFL) system of NetApp, Inc.) in B+ tree format with the key represented by an mode number, and record sizes being fixed.

Exemplary systems suitable for use with the above-described techniques are next described with reference to FIGS. 8-9. The above-described methods may be embodied as instructions on a computer readable medium or as part of a computing architecture.

Figure 8:
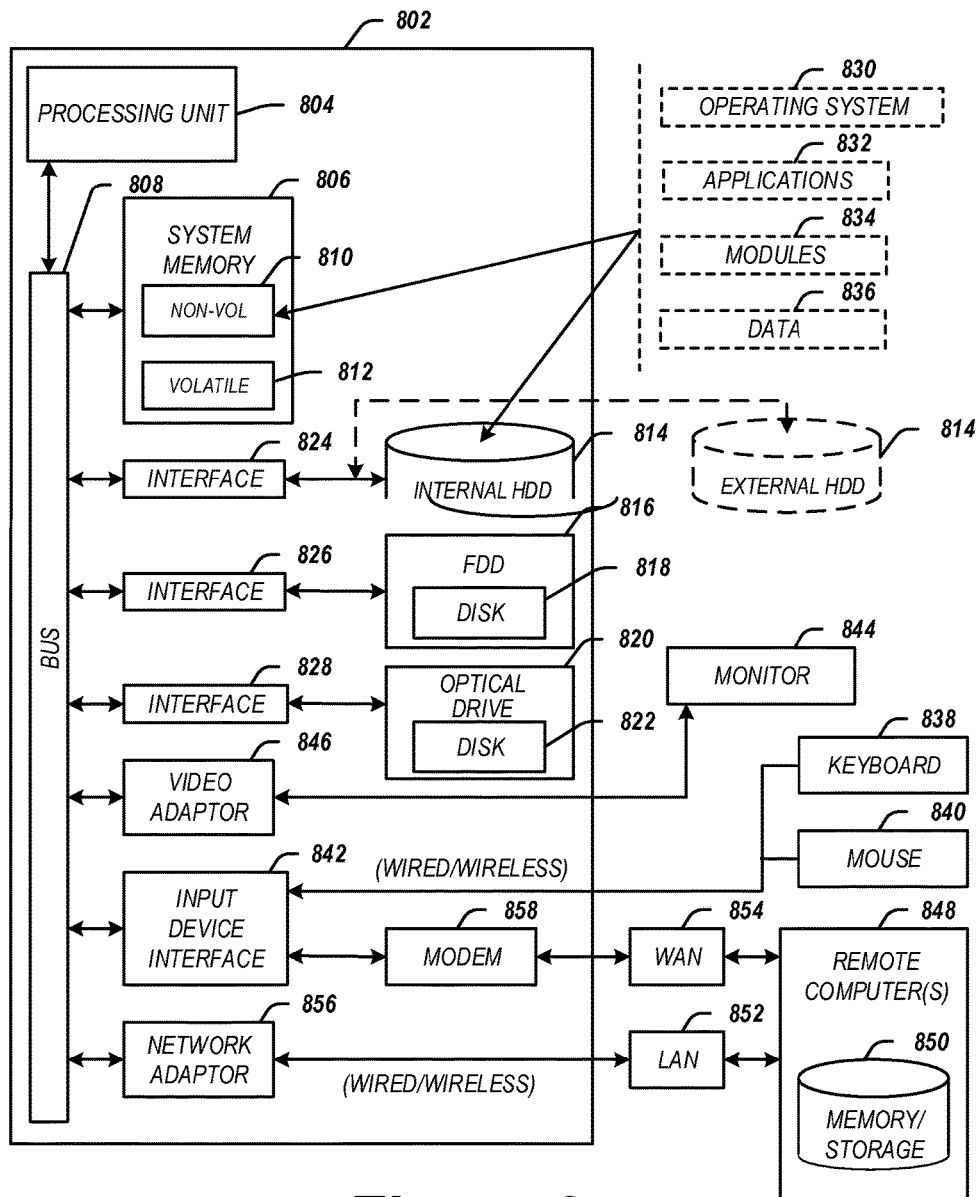
FIG. 8 depicts an exemplary computing device suitable for use with exemplary embodiments.

FIG. 8 illustrates an embodiment of an exemplary computing architecture 800 suitable for implementing various embodiments as previously described. In one embodiment, the computing architecture 800 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 comprises a processing unit 804, a system memory 806 and a system bus 808. The processing unit 804 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 804.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 800 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of the system 30.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 504 through an input device interface 842 that is coupled to the system bus 808, but can be connected by other interfaces such as a parallel port, IEEE 694 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 9:
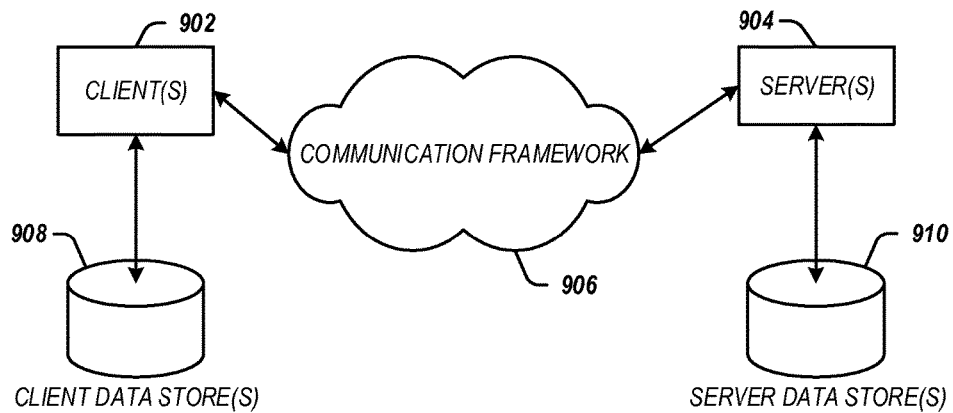
FIG. 9 depicts an exemplary network implementation suitable for use with exemplary embodiments.

FIG. 9 illustrates a block diagram of an exemplary communications architecture 900 suitable for implementing various embodiments as previously described. The communications architecture 900 includes various common communications elements, such as a transmitter, receiver, transceiver, radio, network interface, baseband processor, antenna, amplifiers, filters, power supplies, and so forth. The embodiments, however, are not limited to implementation by the communications architecture 900.

As shown in FIG. 9, the communications architecture 900 comprises includes one or more clients 902 and servers 904. The clients 902 may implement the client device 14 shown in FIG. 1. The servers 604 may implement the server device 104 shown in FIG. 1A. The clients 902 and the servers 904 are operatively connected to one or more respective client data stores 908 and server data stores 910 that can be employed to store information local to the respective clients 902 and servers 904, such as cookies and/or associated contextual information.

The clients 902 and the servers 904 may communicate information between each other using a communication framework 906. The communications framework 906 may implement any well-known communications techniques and protocols. The communications framework 906 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 906 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 902 and the servers 904. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method operations. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method comprising:
   identifying a changed block different between a first file at a first file system and a second file at a second file system;
   extracting a first set of records of the changed block in the first file and a second set of records of the changed block in the second file;
   identifying a set of changed records and a set of unchanged records of the changed block by:
   comparing key/value pairs of records within the first set of records to key/value pairs of corresponding records within the second set of records, wherein a key is an identifier of file data and a value is location information of the file data;
identifying the set of changed records as records and corresponding records that have non-matching key/value pairs; and
identifying the set of changed records as records and corresponding records that have matching key/value pairs;
transmitting the set of changed records of the changed block in the first file to the second file system for updating the changed block in the second file, wherein transmission skips transmitting the set of unchanged records in the changed block.

2. The method of claim 1, comprising:
utilizing a buff tree to identify the changed block.

3. The method of claim 1, wherein the first file comprises a metafile and the second file comprises a replicated version of the metafile.

4. The method of claim 1, wherein the key comprises a name of the first file.

5. The method of claim 1, wherein the key comprises a hash value calculated from a name of the first file.

6. The method of claim 1, wherein the value comprises an absolute location of the first file in a storage volume.

7. The method of claim 1, wherein the value comprises an offset of the first file.

8. The method of claim 1, wherein records stored within the first file are stored in non-fixed locations.

9. The method of claim 1, wherein the first file is represented by a B+ tree.

10. The method of claim 1, wherein the first file is stored by the first file system according to a format that is un-readable by the second file system.

11. The method of claim 1, wherein the first file is represented by a snapshot.

12. A non-transitory machine readable medium comprising instructions for performing a method, which when executed by a machine, causes the machine to:
identify a changed block different between a first file at a first file system and a second file at a second file system;
extract a first set of records of the changed block in the first file and a second set of records of the changed block in the second file;
identify a set of changed records and a set of unchanged records of the changed block by:
comparing key/value pairs of records within the first set of records to key/value pairs of corresponding records within the second set of records, wherein a key is an identifier of file data and a value is location information of the file data;
identifying the set of changed records as records and corresponding records that have non-matching key/value pairs; and
identifying the set of changed records as records and corresponding records that have matching key/value pairs;
transmit the set of changed records of the changed block in the first file to the second file system for updating the changed block in the second file, wherein transmission skips transmitting the set of unchanged records in the changed block.

13. The non-transitory machine readable medium of claim 12, wherein records stored within the first file are stored in non-fixed locations.

14. The non-transitory machine readable medium of claim 12, wherein the first file is represented by a B+ tree.

15. The non-transitory machine readable medium of claim 12, wherein the first file is stored by the first file system according to a format that is un-readable by the second file system.

16. The non-transitory machine readable medium of claim 12, wherein the first file is represented by a snapshot.

17. A computing device comprising:
a memory containing machine readable medium comprising machine executable code having stored thereon instructions for performing a method; and
a processor coupled to the memory, the processor configured to execute the machine executable code to cause the processor to:
identify a changed block different between a first file at a first file system and a second file at a second file system;
extract a first set of records of the changed block in the first file and a second set of records of the changed block in the second file;
identify a set of changed records and a set of unchanged records of the changed block by:
comparing key/value pairs of records within the first set of records to key/value pairs of corresponding records within the second set of records, wherein a key is an identifier of file data and a value is location information of the file data;
identifying the set of changed records as records and corresponding records that have non-matching key/value pairs; and
identifying the set of unchanged records as records and corresponding records that have matching key/value pairs;
transmit the set of changed records of the changed block in the first file to the second file system for updating the changed block in the second file, wherein transmission skips transmitting the set of unchanged records in the changed block.

18. The computing device of claim 17, wherein the first file comprises a metafile and the second file comprises a replicated version of the metafile.

19. The computing device of claim 17, wherein the key comprises a name of the first file.

20. The computing device of claim 17, wherein the key comprises a hash value calculated from a name of the first file.

* * * * *